UNITED STATES PATENT OFFICE.

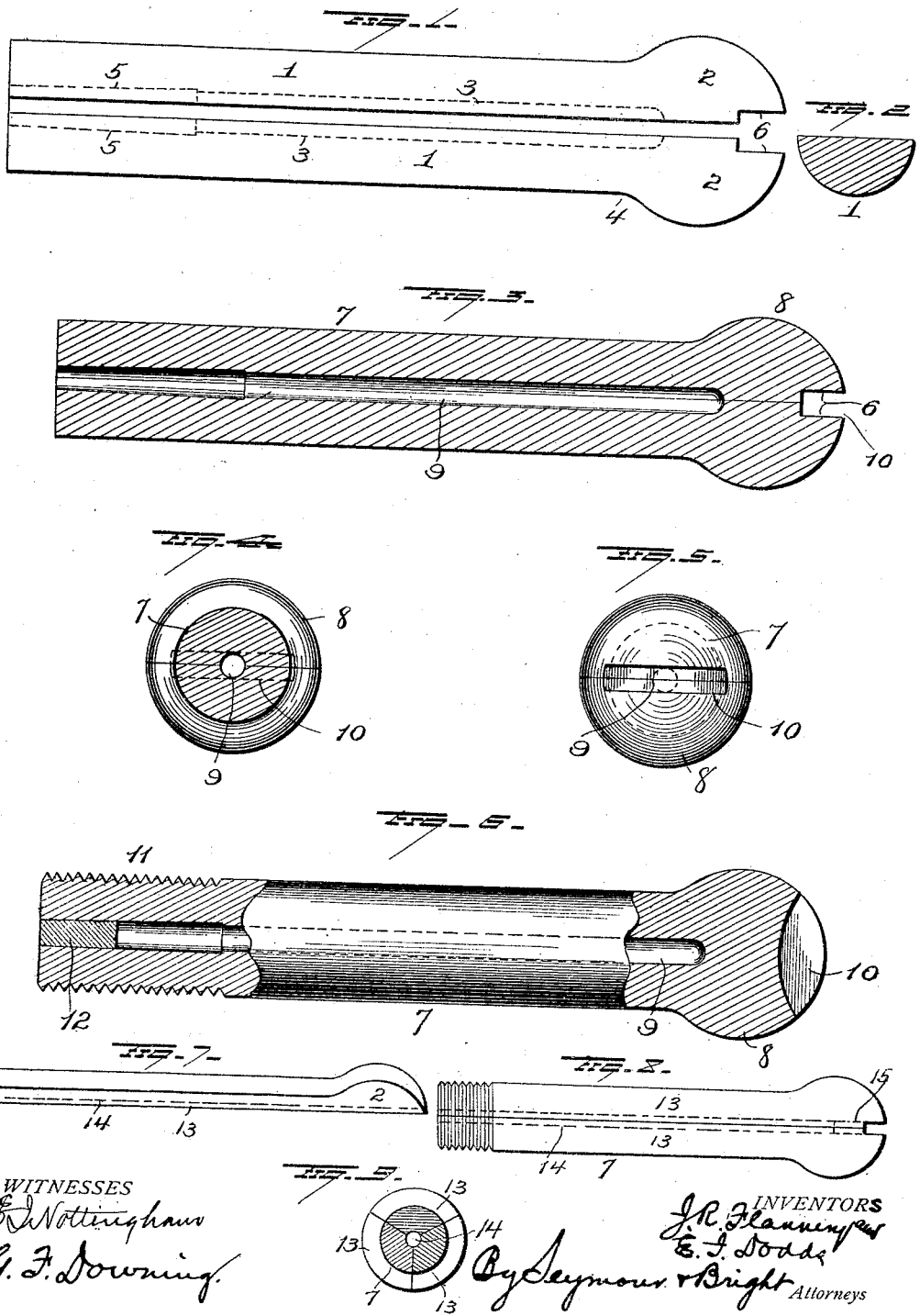
J. R. FLANNERY AND E. I. DODDS.
STAYBOLT FOR BOILERS.
APPLICATION FILED FEB. 21, 1917.
1,366,725.
Patented Jan. 25, 1921.

JOHN ROGERS FLANNERY AND ETHAN I. DODDS, OF PITTSBURGH, PENNSYLVANIA, ASSIGNORS TO FLANNERY BOLT COMPANY, OF PITTSBURGH, PENNSYLVANIA.

STAYBOLT FOR BOILERS.

1,366,725.           Specification of Letters Patent.           Patented Jan. 25, 1921.

Application filed February 21, 1917. Serial No. 150,206.

*To all whom it may concern:*

Be it known that we, JOHN R. FLANNERY and ETHAN I. DODDS, citizens of the United States, and residents of Pittsburgh, in the county of Allegheny and State of Pennsylvania, have invented certain new and useful Improvements in Staybolts for Boilers; and we do hereby declare the following to be a full, clear, and exact description of the invention, such as will enable others skilled in the art to which it appertains to make and use the same.

This invention relates to improvements in staybolts for boilers and more particularly to such as are known in the art as "flexible" staybolts and which are provided with tell-tale holes,—one object of the present invention being to provide a staybolt comprising two members welded together, each member having a portion of the outer head formed thereon and said members having grooves which coöperate to form a tell-tale hole extending from the inner end of the bolt to its headed end and closed at said headed end.

With this and other objects in view, the invention consists in certain features as hereinafter set forth and pointed out in the claim.

In the accompanying drawings; Figure 1 is a view showing the two members composing the bolt, separated; Fig. 2 is a cross section of a bar from which one of the members of the bolt is made; Fig. 3 is a sectional view of the assembled bolt; Fig. 4 is a transverse section; Fig. 5 is an end view. Fig. 6 is a view of the completed bolt, and Figs. 7, 8 and 9 are views illustrating a modification.

In constructing the bolt, we first take two pieces or bars of metal, 1, each semi-circular in cross section as shown in Fig. 2. Each bar or member 1 is then subjected to the action of suitable dies whereby the metal is upset at one end of the same to forge a half-head 2. The bar or member 1 is then formed with a groove 3 in its flat face, by means of suitable dies or otherwise, said groove extending from the inner end of the bar or member to and preferably slightly beyond the neck 4 formed by the juncture of the half head 2 with the body of the member, so that the outer end of the groove will be closed within the head portion. The inner end portion of the groove may be made slightly tapering, as at 5, with the smaller end of the taper at the extremity of the bolt, to facilitate the holding of a temporary plug in the inner end of the assembled bolt as hereinafter explained. The head portion of each bar or member 1 is also provided with a notch 6 at its outer end, as shown in Fig. 1.

When the two bars or members shall have been formed as above explained they will be placed together and welded, preferably by electric welding. A composite bolt 7 is thus formed having a head 8 at its outer end and a tell-tale hole 9 extending from the inner end of the bolt to the headed end thereof and terminating within the head, and the notches 6 of the respective members 1 coöperate to form a tool slot 10 whereby the threaded inner end 11 of the bolt may be screwed through the inner boiler sheet.

A removable or destructible plug 12 may be inserted into the inner end of the tell-tale hole 9 for the purpose of keeping the latter clean.

Instead of making the bolt in two parts, it may comprise a greater number of parts. Thus, the bolt may be constructed as illustrated in Figs. 7, 8, 9, wherein three members 13 are employed, and so formed as to provide a bore 14 extending entirely through the bolt and having its outer end, in the headed portion of the bolt permanently closed by means of a plug 15.

Having fully described our invention, what we claim as new and desire to secure by Letters-Patent, is:—

A staybolt comprising a plurality of members welded together, each member having an integral part-head at one end and each member having a groove extending from the unheaded end and into the part head at the other end, the grooves of the members coöperating to form a tell-tale hole open only at the unheaded end of the bolt and said tell-tale hole being slightly tapering at the unheaded end of the bolt with the smaller portion of the taper at the extremity of the bolt, and a removable plug in said tapering portion of the tell-tale hole.

In testimony whereof we have signed this specification in the presence of two subscribing witnesses.

JOHN ROGERS FLANNERY.
ETHAN I. DODDS.

Witnesses:
F. H. ALLISON,
EDWIN S. RYCE.